United States Patent Office 3,135,375
Patented June 2, 1964

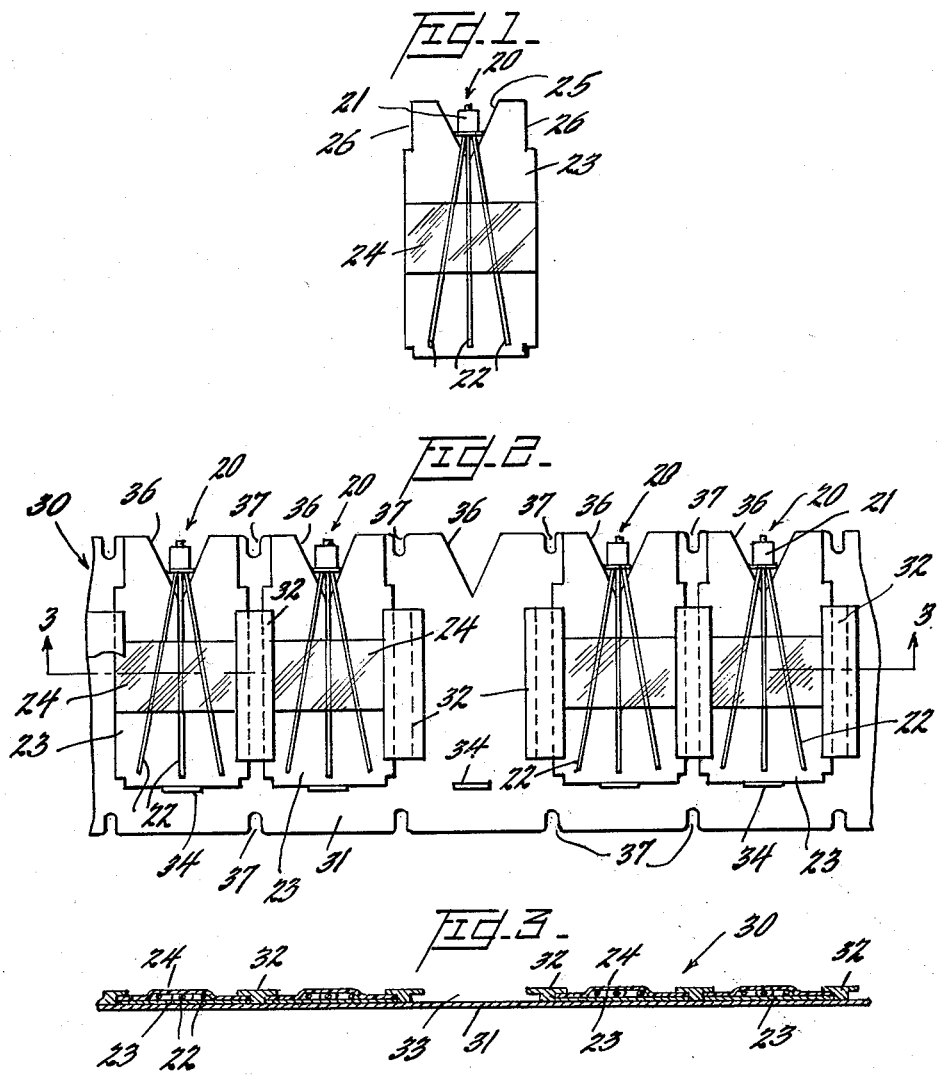

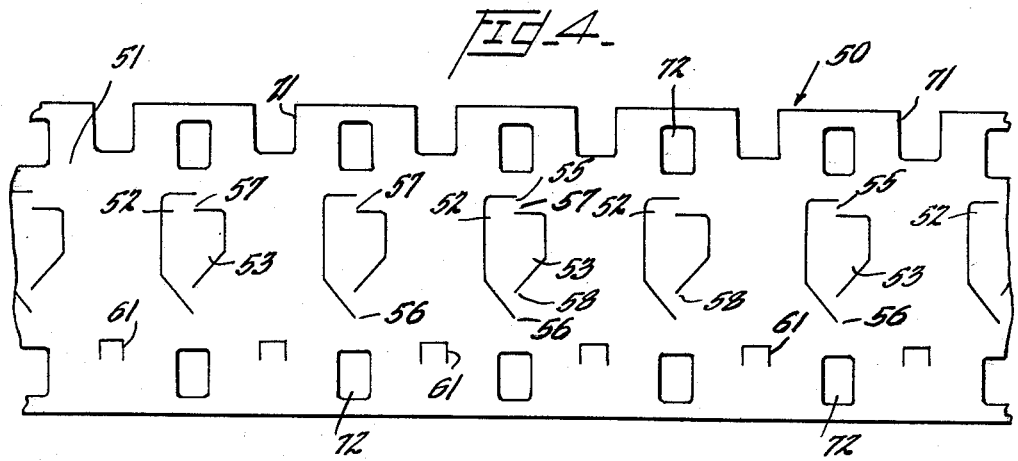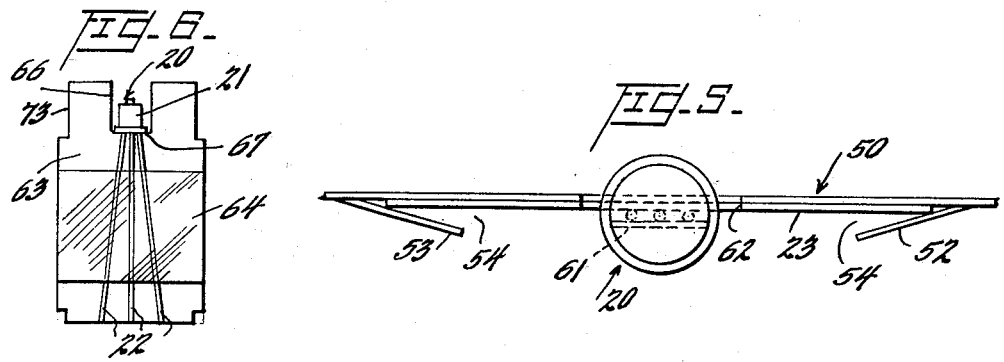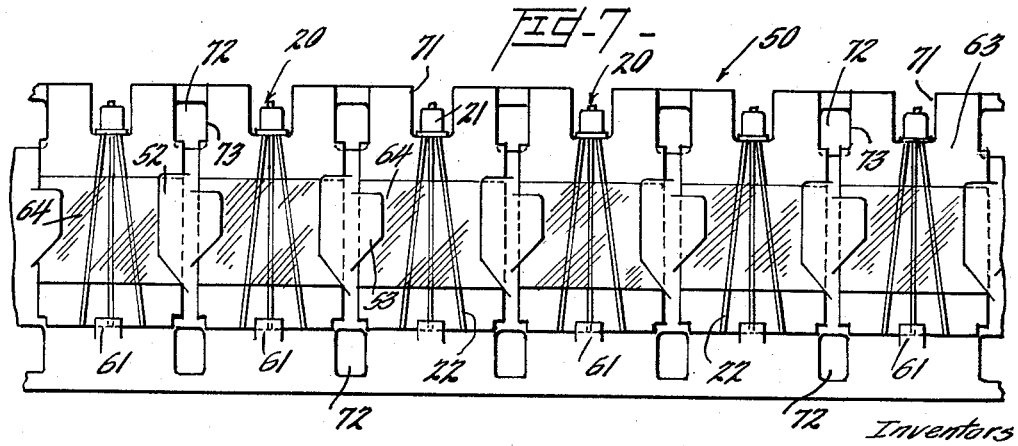

---

3,135,375
ARTICLE CONVEYOR AND STORAGE DEVICE
Cecil B. Henn and Benjamin B. Johnstone, Dayton, Ohio, and William R. Walter, Jr., Greensboro, N.C., assignors, by direct and mesne assignments, of one-half to The Western Electric Company, Inc., Broadway, N.Y., a corporation of New York, and one-half to United Shoe Machinery Corporation, Beverly, Mass.
Filed May 10, 1962, Ser. No. 193,879
7 Claims. (Cl. 198—131)

This invention relates generally to an article conveyor and storage device, and more particularly, to such a device including an elongated belt having a series of specially formed, article retaining slots or pockets thereon. When loaded, the belt may serve as an efficient conveyor, and when not in use as a conveyor, as a convenient, compact, and economical storage device.

Belt-like devices useful as both conveyors and storage devices are known in the prior art; however, this invention represents an improvement over the prior art in that it retains articles carried thereby in a more uniform and accurately oriented position while permitting a larger number of articles to be conveyed or stored on a belt of given length. This invention finds special utility in conveying and storing card-mounted articles, for example, transistors and like electrical components mounted on cards.

Accordingly, it is an object of this invention to provide an improved conveyor and storage device.

A further object is to provide a reusable conveyor which will convey articles with improved uniformity of position and accurate orientation and will convey or store a large number of articles per given length.

It is another object of this invention to provide an improved conveyor and storage device having pockets formed thereon for selectively receiving card-like articles and card-mounted articles.

With these and other objects in mind, a first embodiment of this invention contemplates a belt including a flat, elongated, flexible base, a plurality of holding members fixed to, spaced along, and extending transversely of, the base, to define article retaining slots, and stops positioned between the holding members for terminating, and retaining articles within, the slots.

In an alternative embodiment of this invention, the holding members are formed by slitting the base to provide tabs which define article retaining slots. An additional tab may be provided on the base within the slots to provide a stop for terminating, and retaining articles within, the slots so formed.

These and other objects, aspects, and advantages of this invention are set forth in the following detailed description of this invention and in the accompanying drawings, in which:

FIG. 1 illustrates an electrical component card-mounted in a manner suitable for conveyance by and storage in a first embodiment of this invention;

FIG. 2 is a plan view of a portion of the first embodiment of this invention, partially loaded with the card-mounted articles of FIG. 1, and showing a series of article conveying and storing pockets formed on an elongated, flexible base;

FIG. 3 is a front sectional elevation taken along line 3—3 of the device shown in FIG. 2, having all but one of the card-mounted components removed, and illustrating the manner in which portions of the article conveying and storing pockets are formed;

FIG. 4 is a plan view of an alternative embodiment of this invention in which article conveying and storing pockets are formed on an elongated, flexible base by slitting the base to form tabs;

FIG. 5 is a side elevational view of one pocket of the device shown in FIG. 4 and illustrates the manner in which tabs slit from the base retain a card-mounted component;

FIG. 6 shows an electrical component mounted on a card especially suitable for use with the device illustrated in FIG. 4; and, FIG. 7 is a plan view of the device shown in FIG. 4 in which the pockets formed by slitting the base contain electrical components card-mounted as shown in FIG. 6.

Referring to FIG. 1, an electrical component 20, for example, a transistor having an enlarged header portion 21 and leads 22, is mounted on a card 23 by means of pressure sensitive tape 24. Card 23 may be of stiff paper, cardboard, plastic, or other suitably stiff material and is provided with a V-shaped notch 25 for receiving and orienting the enlarged header portion 21 of component 20. It will be noted that component 20, when mounted with adhesive tape 24 with its enlarged header portion 21 in notch 25, is fixed relative to card 23 in a particular orientation. It follows that the orientation of components similarly mounted on other cards 23 will have the same orientation relative to their respective cards. Card 23 is also provided with a cutaway portion 26 on opposite upper corners.

Although the first embodiment (and an alternative embodiment of this invention) will be described as devices for conveying and storing card-mounted electrical components, such as component 20, it will be readily apparent that the described devices are well suited to conveying and storing any relatively thin, flat, card-like article or any such card-like article having another article mounted thereon.

Referring to FIGS. 2 and 3, a belt generally designated by the number 30, comprises an elongated, flexible base 31 provided in a strip of indefinite length. While the preferred material of base 31 is a flexible, resilient plastic, such as polyethylene, it may also be made of other flexible, resilient materials such as metals, cardboard, and the like.

A series of holding members 32 of generally T-shaped cross section (FIG. 3) are fixed on base 31, transversely thereto, and at regular intervals to provide a series of holding slots 33. The spacing of holding members 32 is such as to snugly accommodate cards 23 (FIG. 3). A stop 34 is fixed to and elevated above base 31 between each adjacent pair of holding members 32 to form an article retaining pocket. Holding members 32 and stops 34 may be of metal, plastic, or other material which may be conveniently fixed to base 31 as by means of rivets, adhesive, heat sealing, or integral formation. Holding members 32 and stops 34 may be flexible, but need not necessarily be so.

As best seen in FIG. 2, cards 23 mounting components 20 thereon may be slipped under the adjacent overhanging portions of holding members 32, that is into holding slots 33, and against stops 34. When so mounted, cards 23 are restrained against movement away from base 31 by the holding members, and against transverse movement by stops 34. Thus, components 20, which are uniformly oriented relative to cards 23, become uniformly oriented relative to base 31, and cards 23, holding members 32, and stops 34 cooperate in maintaining such orientation relative to the base.

When used (as shown) to convey or store articles having enlarged portions thereon, such as components 20 having enlarged header portions 21, base 31 is provided with a series of recesses such as generally V-shaped notches 36. These notches are uniformly formed in the edge of base 31 opposite stops 34 and provide a relieved portion for accommodating and engaging the enlarged portion of an article. Since notches 36 engage the enlarged portions of the components, they further serve to orient the components both horizontally and vertically relative to base 31. In performing such an orienting function, notches 36 cooperate with holding members 32, stops 34, and the bodies of cards 23.

From the foregoing, it will be seen that a highly precise and uniform orientation of the card-mounted components relative to base 31 is realized. Further, since the cards 23 may be placed as closely together as the stem portions of T-shaped holding members 32 will permit, an extremely close packing of card-mounted components on base 31 may be effected. This last mentioned advantage permits a large number of components to be conveyed by or stored in a belt 30 of a given length. It follows that articles may be held on belt 30 in a more compact manner and with notable economies in the materials needed to form the base 31.

Although a relatively short, uncoiled, piece of belt 30 which is loaded with card-mounted components forms a convenient storage device, in situations where large numbers of components are to be stored on a long belt 30, the loaded belt may be coiled about an axis transverse to the base 31 to form a highly convenient, compact, and economical storage device.

Base 31 may be provided with a series of indexing perforations 37 (FIG. 2) in one or both edges. As shown in FIG. 2, these indexing perforations are suitable to be engaged by a belt driving and advancing means (not shown) such as the teeth of a sprocket wheel or a reciprocating pawl. Such driving means serve to advance belt 30 along its longitudinal axis. Indexing perforations of various shapes, sprocket holes, lugs, and other means may be associated with base 31 for this purpose, as will occur to those skilled in the conveyor belt art. Cutaway portions 26 of cards 23 are provided to permit access by the driving means to indexing perforations 37 while maintaining a close packing of cards 23 along the length of belt 30.

The above-described conveyor and storage device may be unloaded by transversely extracting the cards from each of the article holding slots 33. However, a very rapid and convenient way of unloading is simply to pass the loaded device over a wheel or curved surface with the article holding slots 33 to the outside. This action will flex the base and cause the card-mounted articles to be ejected from under the holding members 32. Contrariwise, the above-described device may be loaded by passing the unloaded device over such a wheel or curved surface, thereby opening the slots 33 to the reception of card-mounted components. By making this device of a reasonably durable material, the device may be loaded, unloaded, coiled, uncoiled, and used as a conveyor repeatedly.

From the foregoing, it should be apparent that the above-described article conveying and storage device may be loaded with card-mounted components, used as a conveyor, for example, to feed components in precisely oriented arrangement to an automatic assembly or component inserting machine using such components, or may simply be loaded and coiled into a compact article storage device. Subsequently, the storage device may be transported, uncoiled if necessary, and utilized as a conveyor in the manner described above.

Turning now to FIGS. 4–7, an alternative embodiment of this invention comprises a belt generally designated by the number 50 including a flat, flexible, elongated base 51 of indefinite length which may be of any suitably flexible and resilient plastic, metallic, or paper material. Mylar (a polyester film sold by E. I. du Pont de Nemours and Company, under the registered trademark "Mylar") is an especially suitable plastic material preferred for this purpose.

As best seen in FIG. 4, base 51 is provided with a series of evenly spaced, generally U-shaped slits which form a series of large holding tabs 52. Also, base 51 is provided with a second series of evenly spaced, generally U-shaped slits which form a series of small holding tabs 53. Large tabs 52 each open in the same direction along the longitudinal axis of base 51, while small tabs 53 open in the opposite direction along that axis. Referring to FIG. 5, it will be seen that each large tab 52 cooperates with a small tab 53 to provide an article holding slot 54.

As best illustrated in FIG. 4, the generally U-shaped slit forming each large tab 52 terminates at two points 55 and 56 on a line generally transverse to the longitudinal axis of the base 51, while the generally U-shaped slit forming a small tab 53 terminates on two points 57 and 58 also generally on this same line. Thus, large tabs 52 and small tabs 53 are hinged along a substantially common line of base material. This structure is particularly advantageous as it permits very close packing of component bearing cards to be carried by a base 51 of given length.

A third series of generally U-shaped slits may be made in the base 51 and between the tabs 52 and 53 to form a series of stop tabs 61. These tabs provide a stop for articles retained in slots 54. Thus, large tabs 52, small tabs 53, and stop tabs 61 cooperate to provide a series of article retaining pockets on base 51.

The spacing of each large tab 52 relative to the small tab 53 with which it cooperates to form an article holding slot 54, and the placement of each cooperating stop tab 61 is such as to accommodate articles to be placed therein. Such an article is illustrated in FIG. 6. The component 20, identical for purposes of illustration to that shown in FIG. 1, includes header portion 21 and leads 22, and is mounted on card 63 by means of heat or pressure sensitive adhesive tape 64. Card 63 is identical to card 23 except that it is provided with a generally rectangular notch 66 rather than the generally V-shaped notch 25 of card 23. When articles having generally planar surfaces on enlarged portions thereof, such as surface 67 on header portion 21 (FIG. 6), are to be card-mounted, the generally rectangular notch 66 assists in providing a very accurate vertical orientation of the mounted article relative to the card. Also, the vertical orientation of such articles relative to their respective cards will be exceptionally uniform from card to card.

While tabs 52 and 53 are conveniently referred to as "large tabs" and "small tabs," respectively, it will be apparent that these tabs may be substantially the same size and still leave an adequate hinge of material for both tabs. Although the small tabs 53 are shown in and described with reference to FIG. 4 as being placed between the limits of the slits forming large tabs 52, it will be apparent that each pair of these tabs may also be staggered and still hinged substantially along a common line of material. If staggered, tabs 52 and 53 may be substantially the same size and still be hinged along a substantially common line of base material.

Referring to FIGS. 4 and 7, base 51 may have a series of rectangular recesses such as notches 71 formed in its edges opposite stop tabs 61. Notches 71 generally perform the function of notches 36 in base 31, that is, the sides of notches 71 engage enlarged portions of articles or card-mounted articles held with the article holding pockets and precisely orient such articles relative to the base. As best seen in FIG. 7, notches 71 are of a size and shape similar to notches 66 in cards 63 (FIG. 5). Thus, when a card 63 is slipped within a slot 54, the underside 67 of component 20 engages notch 71 and assists in more precisely orienting the card-mounted component relative to belt 50.

It should be apparent that notches 66 in cards 63 (FIG. 5) might take a variety of shapes so as to suitably conform to and orient components having various shapes to such cards. Similarly, notches 71 may be shaped to conform to such components and assist in orienting them relative to belt 50. Thus, it may be seen that tabs 52 and 53, stop tabs 61, notches 71, and cards 63 all cooperate to orient components 20 uniformly and with a precise orientation relative to belt 50.

In order to impart movement to belt 50, the belt may be associated with any suitable driving means (not shown) for example, a sprocket wheel or reciprocating pawl, which engages perforations 72 formed in one or both edges of base 51. Relieved portions 73 of cards 63 permit access to perforations 72 without increasing the spacing between adjacent cards carried on base 51. This feature of cards 63 permits a greater number of cards 63 to be conveyed by or stored on a given length of belt 50.

This alternative embodiment of the invention possesses the advantages of the first described embodiment thereof. Card-mounted components are held in precise orientation relative to the base. This is highly desirable where the invention is used to feed articles into machines which use the components and must receive them in some predetermined orientation. Automatic circuit assembly and component inserting machines are examples of machines requiring components so oriented. This alternative embodiment may be used as a conveyor, coiled as an article storage device, uncoiled, again used as a conveyor, loaded and unloaded, just as is the case with the first-described embodiment of this invention. However, the alternative embodiment possesses additional advantages. The entire structure may be cut from a single, continuous strip of material as by simply running a blank strip of base material between appropriate roller dies. It is a one piece, unitary construction, inexpensively manufactured to close tolerances. It may be very light in weight and small in bulk so that a storage device made therewith is both of minimum weight and size.

Obviously, the above-described specific embodiments of this invention are merely illustrative and various modifications may be made therein without departing from the spirit and scope thereof.

What is claimed is:

1. In a conveyor and storage device for articles having enlarged portions thereon, a flexible base having spaced recesses formed along one edge thereof, a plurality of rectangular cards spaced along said base in register with said recesses, means extending from said base to overlie and engage the long opposite sides of each card, each of said cards having a recess formed along one short edge in alignment with a recess in the base, and means for securing the articles to said cards to position the enlarged portions thereof in said aligned recesses.

2. An article conveyor and storage device for card-mounted articles having enlarged portions thereon, comprising:
   a flat, elongated, flexible base of indefinite length, having
      recesses formed along one edge thereof for accommodating and engaging the enlarged portions of the articles to orient the articles relative to the base, and,
      feed perforations placed between the recesses;
   a plurality of holding means spaced along the base to define article retaining slots; and,
   stop means extending from the base within the slots to define terminations of the slots and to form article retaining pockets therewith.

3. An article conveyor and storage device for card-mounted articles having enlarged portions thereon, comprising:
   a flat, elongated, flexible base of indefinite length, having
      recesses formed along one edge thereof for accommodating and engaging the enlarged portions of the articles to orient the articles relative to the base, and,
      feed perforations placed between the recesses;
   a plurality of holding means fixed to, spaced along, and extending transversely of, the base to define article retaining slots;
   stop means extending from the base within the slots to define terminations for the slots and to form article retaining pockets therewith; and,
   a plurality of cards
      having the articles removably mounted thereon placed within the article retaining pockets with the enlarged portions of the articles within the recesses formed in the base.

4. A conveyor and storage device for card-mounted articles having enlarged portions thereon, comprising an elongated, flexible base of indefinite length having recesses along one edge thereof for accommodating and engaging the enlarged portions of the articles, said base having a first plurality of generally U-shaped slits cut therein opening in the same direction along the longitudinal axis of the base to provide a first series of tabs, said base having a second series of generally U-shaped slits cut therein opening in the direction opposite to that of the opening of the first series of slits to provide a second series of tabs, each of said first series of tabs being connected to the base along a substantially common line of material with a tab of said second series of tabs, said first and second series of tabs forming a plurality of article retaining slots on the base, and a plurality of cards having the articles removably mounted thereon placed within the article retaining slots with the enlarged portions of the articles within the recesses of the base.

5. A conveyor and storage device for card-mounted articles according to claim 4, wherein the base is provided with a third series of tabs each of which is positioned on the base within an article retaining slot to form an article retaining pocket, and said cards are positioned within the pockets and against tabs of said third series of tabs.

6. A conveyor and storage device for card-mounted articles according to claim 4, wherein feed perforations are formed in the base between the recesses.

7. A conveyor and storage device for card-mounted articles having enlarged portions thereon, comprising:
   an elongated, flexible base of indefinite length having
      recesses formed in one edge thereof for accommodating and engaging the enlarged portions of the articles,
      a first plurality of generally U-shaped slits cut therein opening in the same direction along the longitudinal axis of the base to form a first series of tabs,
      a second plurality of generally U-shaped slits cut therein opening in the direction opposite to that of the opening of the first plurality of slits to form a second series of tabs, each of said first series of tabs being connected to the base along a substantially common line of material with a tab of said second series of tabs, said first and second series of tabs forming a plurality of article retaining slots on the base, a third series of tabs formed therein between tabs of said first and second series of tabs forming a plurality of article retaining pockets, and feed perforations formed therein between the recesses; and, a plurality of generally rectangular cards
  having recesses formed along one short edge thereof,
  having the articles removably mounted thereon with the enlarged portions thereof within the recesses in the cards, and
  placed within the article retaining pockets with the enlarged portions of the articles within the recesses of the base.

References Cited in the file of this patent

UNITED STATES PATENTS

| | | |
|---|---|---|
| 2,147,086 | Bryan | Feb. 14, 1939 |
| 2,828,001 | Bornemann | Mar. 25, 1958 |
| 2,845,758 | Lowthian | Aug. 5, 1958 |
| 3,015,287 | Noel | Jan. 2, 1962 |